(12) United States Patent
Iizuka et al.

(10) Patent No.: US 7,732,963 B2
(45) Date of Patent: Jun. 8, 2010

(54) SMALL-SIZED MOTOR HAVING RING-SHAPED FIELD MAGNET

(75) Inventors: Satoshi Iizuka, Matsudo (JP); Mitsushi Kinoshita, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 96 days.

(21) Appl. No.: 11/833,475

(22) Filed: Aug. 3, 2007

(65) Prior Publication Data

US 2008/0030095 A1 Feb. 7, 2008

(30) Foreign Application Priority Data

Aug. 4, 2006 (JP) ............................. 2006-212877

(51) Int. Cl.
  H02K 21/26 (2006.01)
  H02K 21/38 (2006.01)
  H02K 23/04 (2006.01)
  H02K 1/17 (2006.01)

(52) U.S. Cl. ...................... 310/154.21; 310/40 MM; 310/269; 310/154.01; 310/54; 310/52

(58) Field of Classification Search ............... 310/154, 310/154.21, 269, 40 MM, 156, 52, 54; H02K 1/17, H02K 21/26, 21/38, 23/04
See application file for complete search history.

(56) References Cited

U.S. PATENT DOCUMENTS

| | | | | |
|---|---|---|---|---|
| 2,278,489 A | * | 4/1942 | Rawlings | 310/154.25 |
| 2,894,156 A | * | 7/1959 | Kent | 310/154.25 |
| 3,278,776 A | * | 10/1966 | Dochterman | 310/154.25 |
| 3,500,090 A | * | 3/1970 | Baermann | 310/154.14 |
| 5,095,238 A | * | 3/1992 | Suzuki et al. | 310/156.46 |
| 5,162,684 A | * | 11/1992 | Hayakawa | 310/154.28 |
| 5,206,556 A | * | 4/1993 | Hayakawa | 310/154.28 |
| 5,682,072 A | * | 10/1997 | Takahashi | 310/156.46 |

(Continued)

FOREIGN PATENT DOCUMENTS

JP 52-44313 3/1977

(Continued)

OTHER PUBLICATIONS

Kuhlmann.pdf : Design of Electrical Apparatus, Kuhlmann, 1959.*

*Primary Examiner*—Quyen Leung
*Assistant Examiner*—John K Kim
(74) *Attorney, Agent, or Firm*—McGlew and Tuttle, P.C.

(57) ABSTRACT

A small-sized motor includes a field magnet attached to an inner circumferential surface of a metallic motor casing and having four or more magnetic poles. The field magnet is formed of a single ring-shaped magnet member having a predetermined thickness with respect to the radial direction and a predetermined length with respect to the thrust direction. At each of portions between the magnetic poles formed through magnetization, the magnet member has a thin portion having a reduced thickness with respect to the radial direction, the thin portion being formed by cutting the magnet member from the radially outward side. The magnetization is performed in the radial direction so as to alternately form S poles and N poles in the circumferential direction. At each of portions between the magnetic poles, the magnet member may have cut portions formed at opposite end portions of the magnet member with respect to the thrust direction.

11 Claims, 9 Drawing Sheets

U.S. PATENT DOCUMENTS

| | | | |
|---|---|---|---|
| 5,723,929 A * | 3/1998 | Niimi | 310/154.43 |
| 5,949,169 A * | 9/1999 | Niimi | 310/154.43 |
| 6,181,035 B1 * | 1/2001 | Acquaviva | 310/51 |
| 6,891,296 B1 * | 5/2005 | Huang et al. | 310/156.01 |
| 6,987,340 B2 * | 1/2006 | Kaneshige | 310/154.28 |
| 2002/0047422 A1 * | 4/2002 | Tomiyama et al. | 310/154.08 |
| 2005/0110364 A1 * | 5/2005 | Yanagisawa | 310/261 |
| 2005/0174003 A1 * | 8/2005 | Naito et al. | 310/156.32 |

FOREIGN PATENT DOCUMENTS

| | | |
|---|---|---|
| JP | 60-59752 | 4/1985 |
| JP | 60-62842 | 5/1985 |
| JP | 62-138047 | 6/1987 |
| JP | H10-201206 | 7/1998 |

* cited by examiner

ARCUATE CUT PORTION

THIN PORTION

FIG. 6B

TRAPEZOIDAL CUT PORTION

THIN PORTION

FIG. 6C

TRIANGULAR CUT PORTION

THIN PORTION

FIG. 7A

SMALL REMOVED PORTION
LARGE REMOVED PORTION
LARGE CUT PORTION
SMALL CUT PORTION
LARGE REMOVED PORTION

FIG. 7B

LARGE REMOVED PORTION
SMALL REMOVED PORTION
LARGE REMOVED PORTION

FIG. 8A

REMOVED PORTIONS TAPERED IN OPPOSITE DIRECTIONS ALTERNATELY

FIG. 8B

REMOVED PORTIONS TAPERED IN THE SAME DIRECTION

FIG. 9A

CIRCUMFERENTIALLY SKEWED REMOVED PORTION

FIG. 9B

CIRCUMFERENTIALLY STEPPED REMOVED PORTION

PRIOR ART

SMALL-SIZED MOTOR HAVING RING-SHAPED FIELD MAGNET

BACKGROUND OF THE INVENTION

1. Field of the Invention

The present invention relates to a small-sized motor for use in, for example, power tools and electric equipment for vehicles such as door locks and seat adjusters, and more particularly to a structure of a magnet for stator magnetic poles attached to the inner circumferential surface of a motor casing.

2. Description of the Related Art

Figure 11:
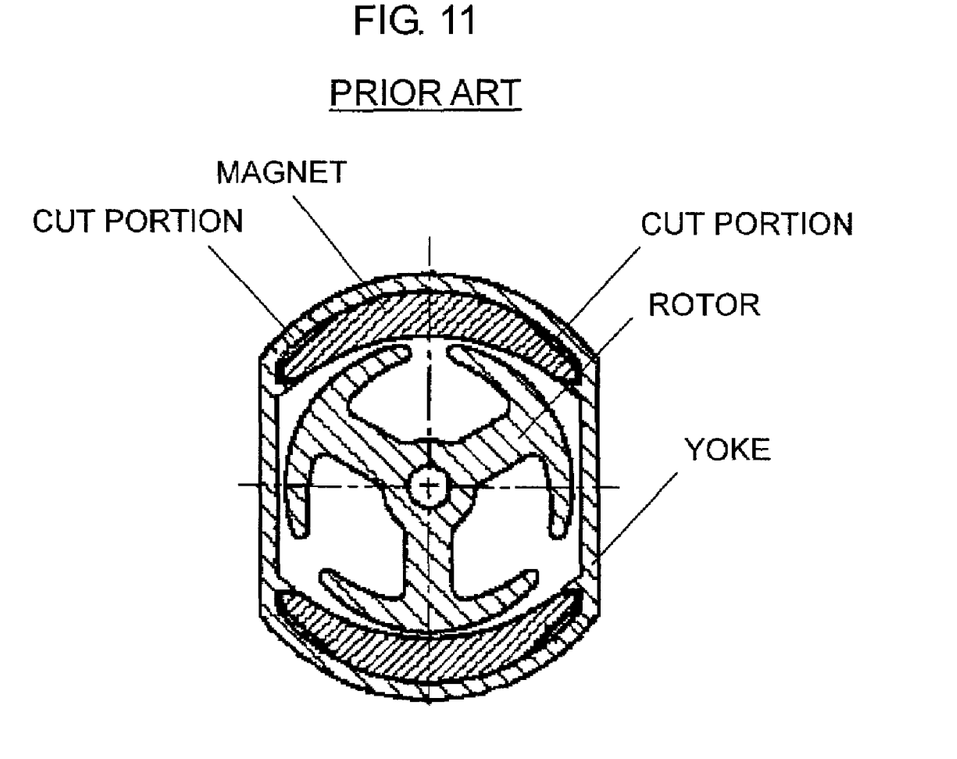
FIG. 11 is a cross sectional view of a conventional small-sized motor.

FIG. 11 is a cross sectional view of a conventional small-sized motor as shown in Japanese Patent Application Laid-Open (kokai) No. H10-201206. This motor includes a rotor having three magnetic poles; a yoke disposed to surround the rotor; and two stator pole magnets attached to the inner surface of the yoke and each having an arcuate (C-shaped) cross section. Each of the magnets has such a shape that the gap between the magnet and the outer circumferential surface of the rotor gradually increases from a central portion to opposite end portions along the circumferential direction of the rotor.

Moreover, in each of the illustrated magnets, the back surfaces (outer surfaces) of the opposite end portions are cut so that cut portions are formed there. By means of changing the shape of these cut portions, magnetic flux density at the opposite end portions of each magnet can be adjusted.

In general, each stator pole magnet is formed such that the radial distance between the magnet and the outer circumferential surfaces of the rotor poles gradually increases from its circumferential center toward the opposite end portions so as to gradually weaken the magnetic field. This configuration makes it possible to avoid abrupt changes in the magnetic field, which would otherwise occur upon rotation of the rotor. Thus, generation of cogging torque can be mitigated.

However, since the illustrated motor requires an operation of assembling a plurality of (two) C-shaped magnets into the yoke, particularly when four or more magnets are assembled into the yoke, their positioning and fixing are difficult. That is, the structure of the illustrated motor is disadvantageous in terms of production cost and quality. Further, in order to reduce the magnetic flux from the central portion toward the opposite ends thereof, the illustrated magnet is formed in such a manner as to gradually increase the gap between the magnet and the outer circumferential surface of the rotor from the central portion toward the opposite ends thereof. However, such a shape reduces the magnetic flux generated by use of an excessively large magnet by widening the gap, and therefore is not efficient.

SUMMARY OF THE INVENTION

The present invention has been accomplished so as to solve the above-described problem, and an object of the present invention is to provide a small-sized motor which includes a multi-pole magnet having four or more poles and which can mitigate generation of cogging torque without excessively lowering motor torque.

Another object of the present invention is to provide a small-sized motor which enables a plurality of pole magnets to be assembled into a motor casing all together and firmly fixed thereto and which can reduce the volume of the magnet to thereby reduce cost.

A small-sized motor according to the present invention includes a field magnet attached to an inner circumferential surface of a metallic motor casing and having four or more magnetic poles. The field magnet is formed of a single ring-shaped magnet member having a predetermined thickness with respect to the radial direction and a predetermined length with respect to the thrust direction. At each of portions between the magnetic poles formed through magnetization, the magnet member has a thin portion having a reduced thickness with respect to the radial direction, the thin portion being formed by cutting the magnet member from the radially outward side. The magnetization is performed in the radial direction so as to alternately form S poles and N poles in the circumferential direction. At each of portions between the magnetic poles, the magnet member may have cut portions formed at opposite end portions of the magnet member with respect to the thrust direction.

According to the present invention, a constant gap can be maintained between the magnet and the rotor pole core, and, through formation of thin portions between the poles of the multi-pole magnet, generation of cogging torque can be mitigated, without excessively lowering the motor torque.

Moreover, since the magnet is formed into a ring-like shape as a whole, multiple poles can be readily formed on the magnet. In addition, this multi-pole magnet can be assembled into the motor casing as a single member and firmly fixed thereto. Thus, ease of assembly and productivity can be improved, whereby cost can be lowered.

Moreover, since clearances are formed between the magnet assembled as a single member and the motor casing, the magnet can be firmly fixed to the motor casing by means of feeding an adhesive into the clearances.

DETAILED DESCRIPTION OF THE PREFERRED EMBODIMENTS

Figure 1:
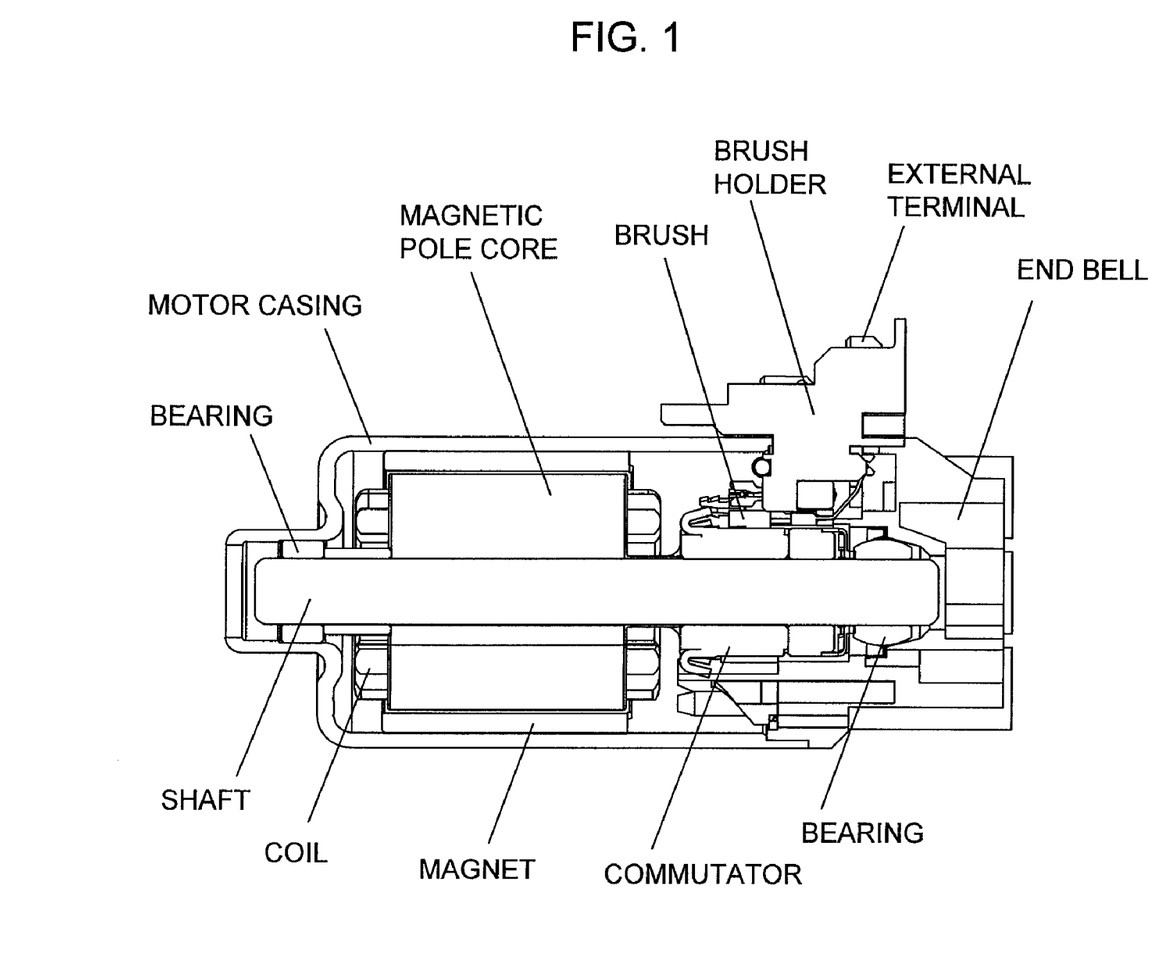
FIG. 1 is a vertical sectional view showing the configuration of a small-sized motor according to the present invention.

The present invention will next be described by way of examples. FIG. 1 is a vertical sectional view showing the configuration of a small-sized motor according to the present invention. The illustrated small-sized motor includes a magnet having four field poles and ten rotor poles (see FIG. 3). However, the present invention can be applied to any small-sized motor which includes four or more field poles (e.g., 4 poles, 6 poles, or 8 poles) and three or more rotor poles.

As shown in FIG. 1, a field magnet is attached to the inner circumferential surface of a motor casing formed into a hollow cylindrical shape from, for example, a metallic material. A cylindrical side wall of the motor casing forms a yoke serving as a magnetic path of the magnet. An end bell (casing cap) is attached to an opening portion of the motor casing. Although the illustrated motor case has a cylindrical side wall, the side wall may assume a polygonal shape having sides which are equal in number to the field poles.

A shaft of a rotor is supported by a bearing provided at a central portion of the end bell and a bearing provided at the center of a bottom portion of the motor casing. Notably, the shaft can be extended via the latter bearing to the outside of the motor over a proper length determined in accordance with an external load connected to the shaft. The rotor formed on the shaft has a rotor pole structure composed of a magnetic pole core and coils wound on the magnetic pole core. A commutator is fixedly provided on the shaft. A pair of brushes, which come into contact with the commutator, are held by a brush holder attached to the motor casing. Electrical power for the motor is externally supplied via external terminals electrically connected to the brushes. As will be described in detail, the feature of the present invention resides in the structure of the field magnet and the manner of attaching the magnet to the motor casing. Thus, the structure of the rotor, including the rotor magnetic poles and the commutator, and the power supply structure, such as the brushes, are not limited to those shown in the drawings, and other ordinary structures can be employed.

Figure 2A:
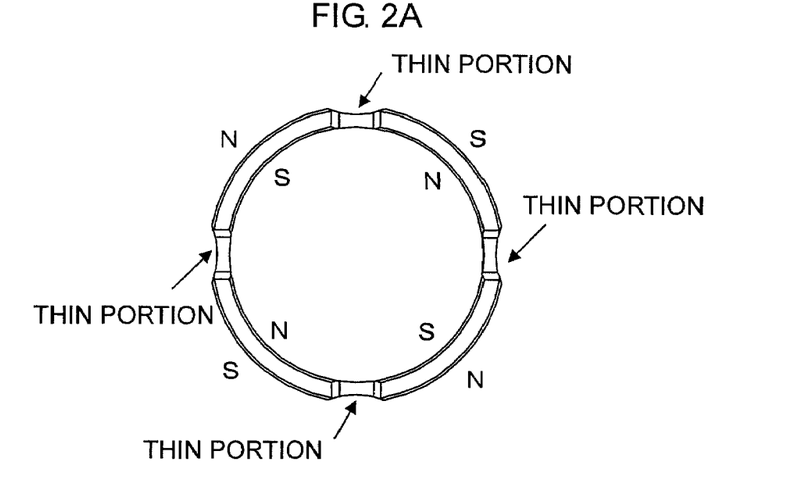
FIGS. 2A to 2C are views showing a magnet having four magnetic poles.
Figure 2B:
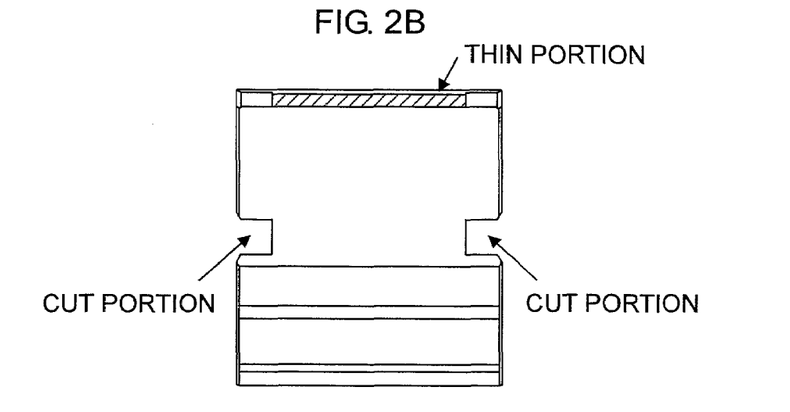
Figure 2C:
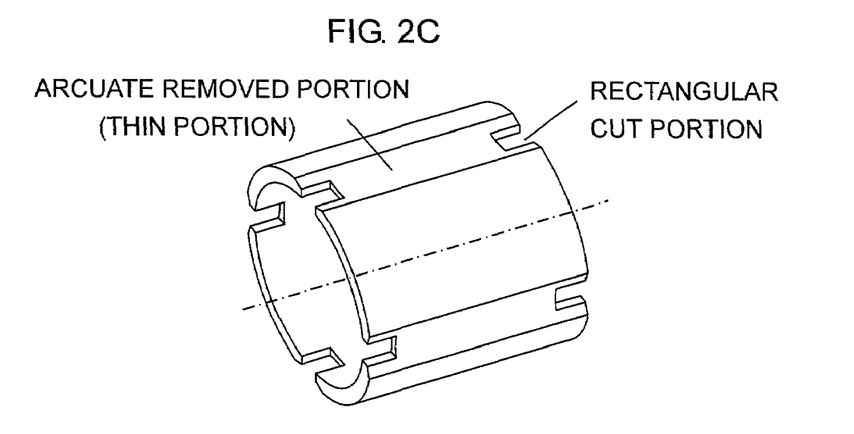

FIGS. 2A to 2C are views showing a magnet having four magnetic poles, wherein FIG. 2A is a side view of the magnet, FIG. 2B is a vertical cross section of the magnet with an upper half thereof shown in cross section, and FIG. 2C is a perspective view of the magnet. The illustrated magnet has four magnetic poles formed through magnetization performed in the radial direction so as to alternately form S poles and N poles in the circumferential direction. The magnet may be an ordinary magnet such as a plastic magnet (e.g., neodymium bond magnet) or a sintered magnet. The illustrated magnet is formed of a single ring-shaped magnet member having a predetermined thickness with respect to the radial direction and a predetermined length with respect to the thrust direction. At a central portion between adjacent magnetic poles or the vicinity thereof, the material of the magnet member is arcuately removed from the radially outward side thereof so as to form a thin portion having a reduced thickness with respect to the radial direction. Notably, in the illustrated example, the removed portion has an arcuate cross sectional shape; however, the removed portion may have any cross sectional shape such as a semicircular cross section, a flat cross section, or a concave cross section.

Further, as shown in FIGS. 2B and 2C, at a central portion between adjacent magnetic poles or the vicinity thereof, cut portions may be provided at the opposite ends of the ring-shaped magnet with respect to a direction parallel to the shaft (thrust direction). This structure reduces the volume of the magnet, while maintaining the ring shape. In the illustrated example, the cut portions have a rectangular shape. However, as will be described with reference to FIGS. 6A to 6C, the cut portions may have arbitrary shape.

Such a magnet can be fabricated through a process of molding a magnetic material into a generally ring-like shape having thin portions (and cut portions) as shown in FIGS. 2A to 2C and forming a plurality of magnetic poles thereon through magnetization. Since thin portions are provided on the magnet such that the wall thickness changes in the circumferential direction, the magnetic flux of the magnet becomes the maximum at the circumferential center of each pole and gradually decreases with increasing distance from the circumferential center to thereby reduce cogging torque. Since the cut portions are provided on the magnet in addition to the thin portions, the magnet material can be removed between the magnetic poles of the magnet, whereby the material cost can be reduced. Although the cost of the magnet material accounts for a large portion of the production cost of small-sized motors, through formation of thin portions (and cut portions) on the magnet as in the illustrated structure, the material cost of the magnet can be reduced. The amount of material removal from the magnet for forming the thin portions is desirably set to 40% or less the volume of the magnet, in order to prevent an excessive drop in motor performance and maintain the ring shape.

Since a plurality of pole magnets are integrally formed to have a ring shape as a whole, the pole magnets can be assembled into the motor casing all together, and positioning and fixing become easier. In order to reduce the magnetic flux from the circumferentially central portion of each magnetic pole of the magnet toward the opposite ends thereof, rather than widening the gap between the magnet and the outer circumferential surface of the rotor, thin portions where the radially outward side of the magnet is cut and removed (and cut portions) are formed, while maintaining the gap constant. Therefore, an efficient shape is attained. By virtue of this configuration, at a circumferentially central portion of each magnetic pole, a thickness for generating a magnetic field of a sufficient strength can be secured, and the gap can be maintained constant, whereby cost and cogging torque can be reduced, without causing a drop in motor output torque.

Figure 3:
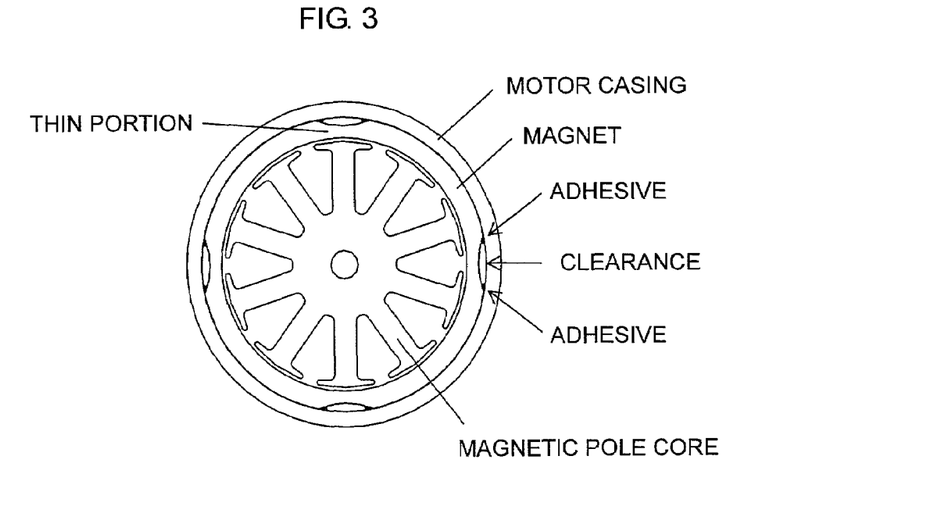
FIG. 3 is a schematic sectional view of a small-sized motor according to the present invention taken along a central portion of the magnet.

FIG. 3 is a schematic sectional view of a small-sized motor according to the present invention taken along a central portion of the magnet. FIG. 3 shows a small-sized motor which includes a magnet having four field poles and ten rotor poles; however, the coils are not illustrated. As described above, the field magnet of the present invention has removed portions (thin portions) formed between the magnetic poles. Therefore, when the ring-shaped magnet is assembled into the motor casing, clearances are formed between the inner surface of the motor casing and the magnet. An adhesive is fed into the clearances, whereby the ring-shaped magnet can be firmly fixed.

EXAMPLES

Figure 4A:
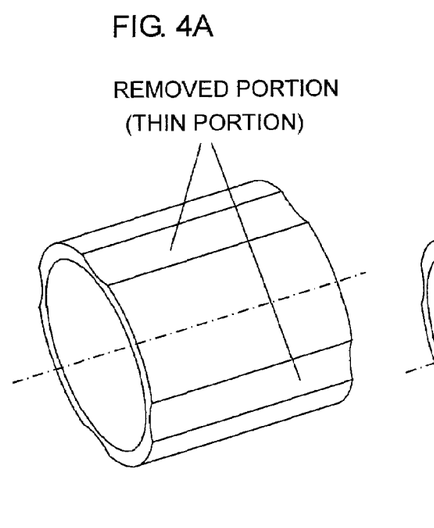
FIGS. 4A and 4B are views showing examples in which, at each of central portions between the magnetic poles, the magnet is arcuately cut from the radially outward side to thereby form a thin portion.
Figure 4B:
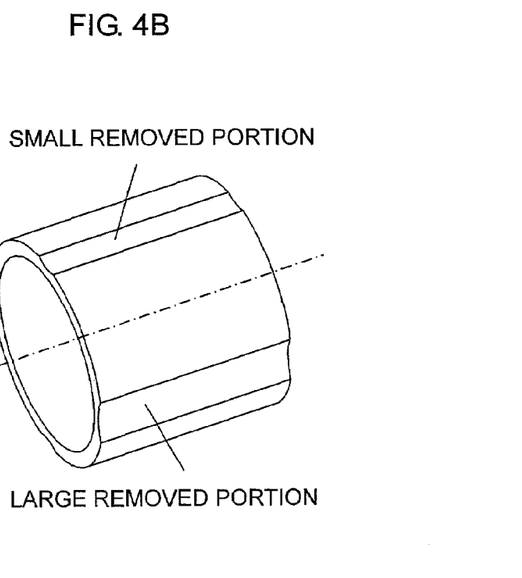

FIGS. 4A to 9B are views showing various example structures of the ring-shaped magnet. FIGS. 4A and 4B show examples structures of a magnet having four field poles in which, at each of central portions between the magnetic poles, the magnet is arcuately cut from the radially outward side to thereby form a thin portion. However, the above-described cut portions are not provided. FIG. 4A shows an example in which the four removed portions (thin portions) between the four magnetic poles have the same shape, and FIG. 4B shows an example in which the four removed portions (thin portions) have different shapes. That is, FIG. 4B shows an example in which large removed portions (arcuately removed portions) and small removed portions (arcuately removed portions) are alternately disposed in the circumferential direction.

Figure 5A:
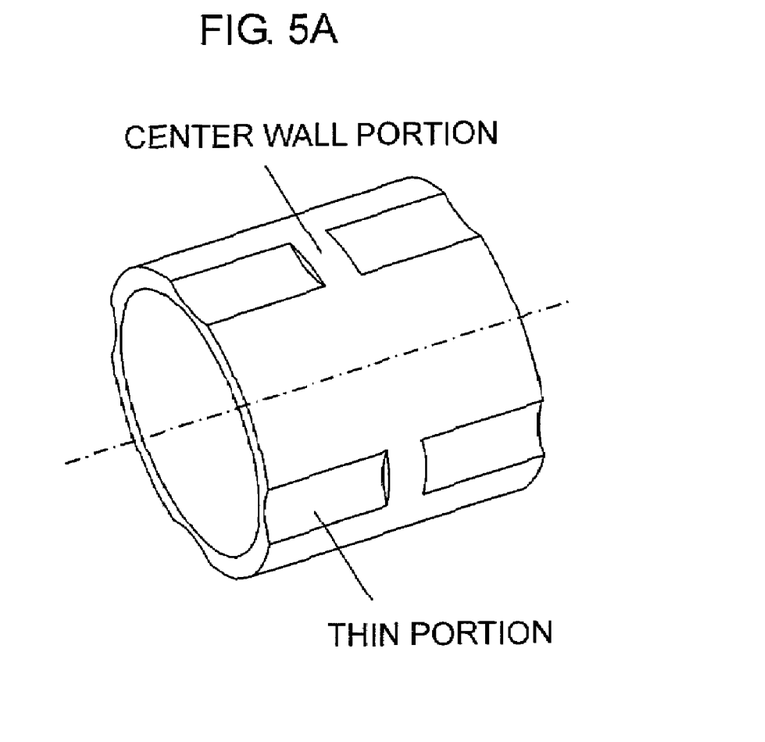
FIGS. 5A and 5B are views showing example thin portions each having a wall portion provided at a longitudinally intermediate portion thereof.
Figure 5B:
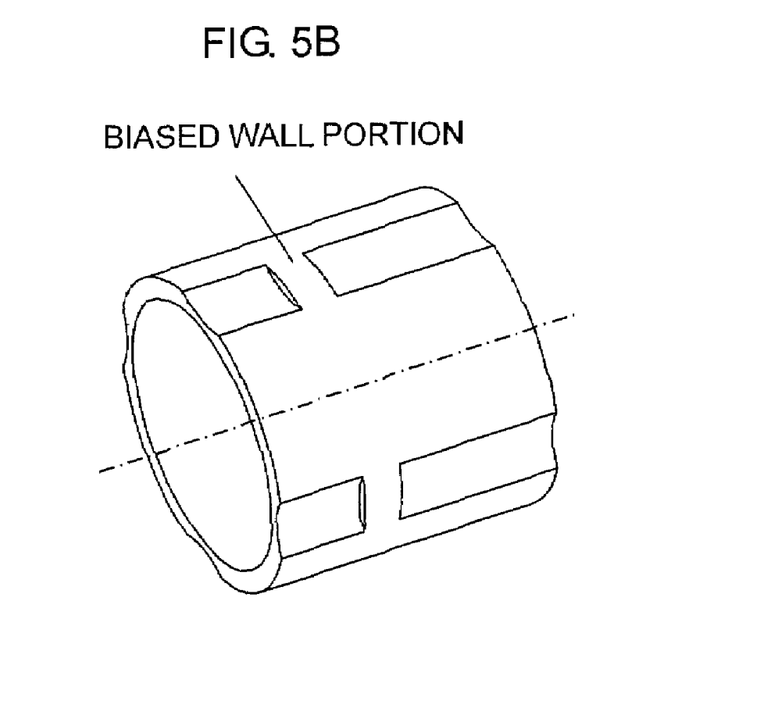

The thin portions are not necessarily required to extend over the entire length of the magnet (in the thrust direction). As shown in FIGS. 5A and 5B, a wall portion may be provided on each thin portion at an intermediate position with respect to the length direction. Cogging torque can be reduced by a structure in which the magnetic flux of the magnet integrated in the thrust direction smoothly decreases and increases between the magnetic poles of the magnet. FIG. 5A shows an example in which a center wall portion is provided on each thin portion at the center thereof with respect to the length direction. FIG. 5B shows an example in which a biased wall portion is provided on each thin portion at a non-center position thereof with respect to the length direction.

Figure 6A:
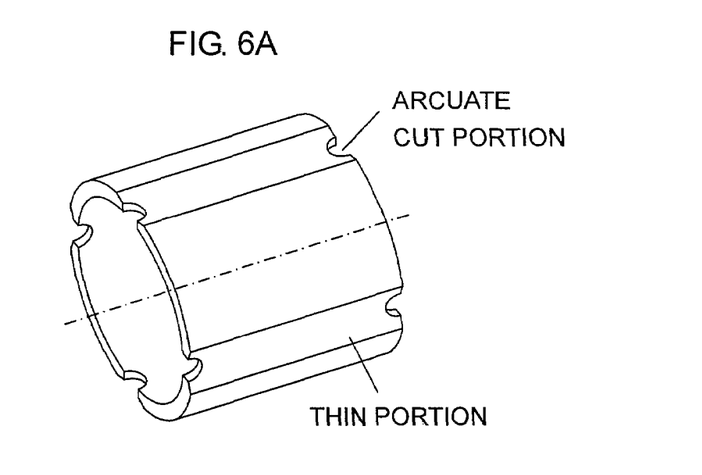
FIGS. 6A to 6C are views showing examples in which in addition to thin portions (removed portions), cut portions are formed at opposite ends of the magnet.
Figure 6B:
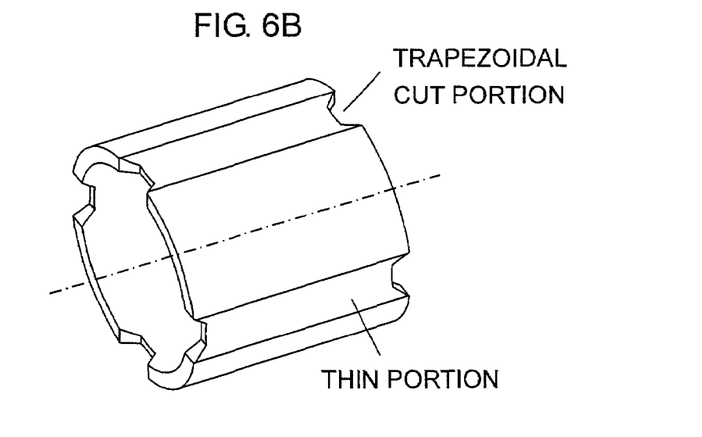
Figure 6C:
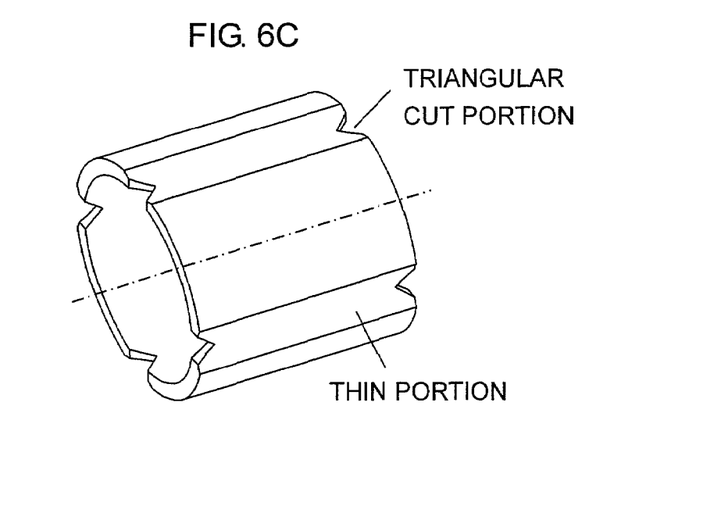

FIGS. 6A to 6C are views showing examples in which in addition to the thin portions (removed portions), cut portions are formed, wherein the cut portions have shapes different from that of the above-described rectangular cut portions (see FIG. 2). FIG. 6A shows arcuate cut portions, FIG. 6B shows trapezoidal cut portions, and FIG. 6C shows triangular cut portions. As shown in these drawings, in addition to the thin portions, cut portions are formed at opposite ends of the ring-shaped magnet to be located at the respective central portions between the magnetic poles; i.e., to coincide with the circumferential positions of the thin portions. By virtue of this structure, not only the thin portions but also the cut portions decrease the volume of the magnet to thereby reduce the cost of the magnet material, and cause the magnetic flux of the magnet to smoothly decrease and increase between the magnetic poles of the magnet to thereby reduce cogging torque.

Figure 7A:
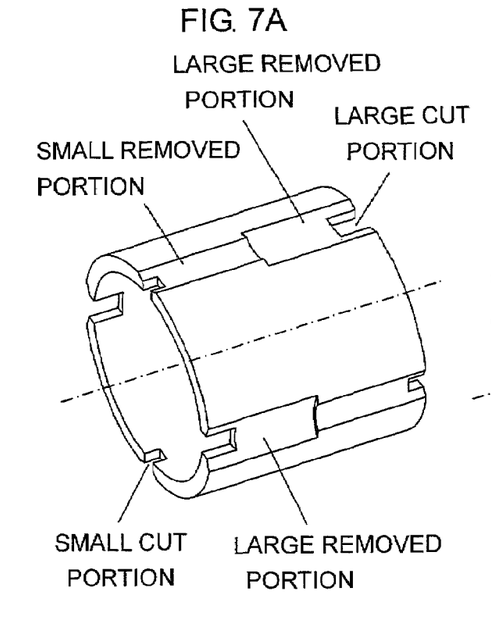
FIGS. 7A and 7B are views showing example thin portions each formed by a large removed portion, a large cut portion formed there, a small removed portion, and a small cut portion formed there.
Figure 7B:
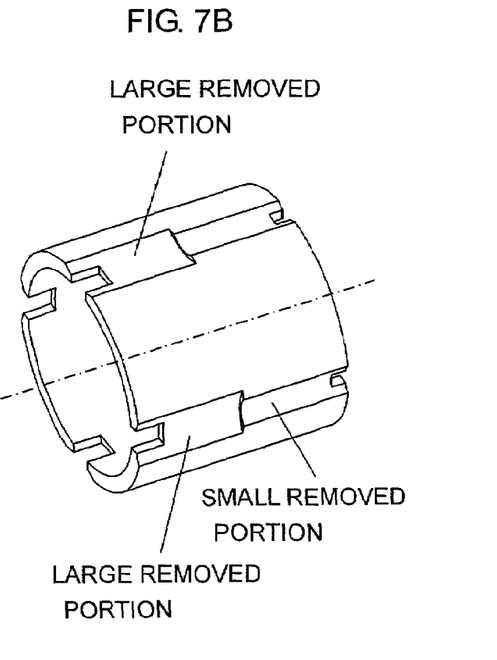

FIGS. 7A and 7B show examples in which thin portions are formed through arcuate cutting and rectangular cut portions are formed. Specifically, FIG. 7A shows an example in which four thin portions, each composed of a large removed portion, a large cut portion formed there, a small removed portion, and a small cut portion formed there, are formed such a manner as to alternately dispose, in the circumferential direction, two thin portions in which the large removed portion and the large cut portion are located on the right side and the small removed portion and the small cut portion are located on the left side, and two thin portions in which the large removed portion and the large cut portion are located on the left side and the small removed portion and the small cut portion are located on the right side. FIG. 7B shows an example in which all the four thin portions are formed such that the large removed portion and the large cut portion are located on the left side and the small removed portion and the small cut portion are located on the right side, for example. As described above, the thin portions (removed portions) and the cut portions are not necessarily required to be formed symmetrically with respect to the length direction of the magnet. As shown in FIGS. 7A and 7B, the thin portions (removed portions) and the cut portions may be formed asymmetrically with respect to the length direction of the magnet. In this case as well, the magnetic flux of the magnet integrated in the thrust direction smoothly decreases and increases between the magnetic poles of the magnet to thereby reduce cogging torque.

Figure 8A:
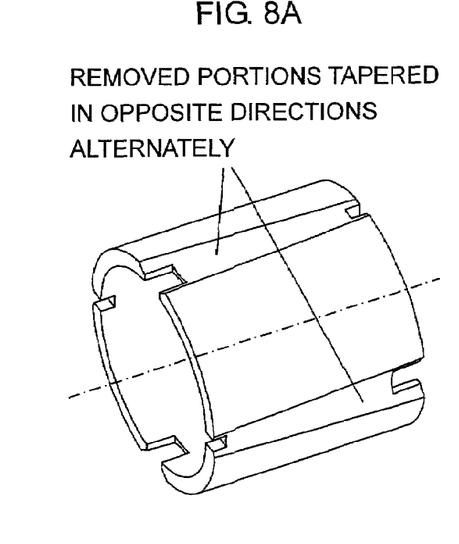
FIGS. 8A and 8B are views showing example tapered thin portions each having cut portions of different sizes at opposite ends thereof and formed by removed portions whose widths change linearly along the length direction of the magnet.
Figure 8B:
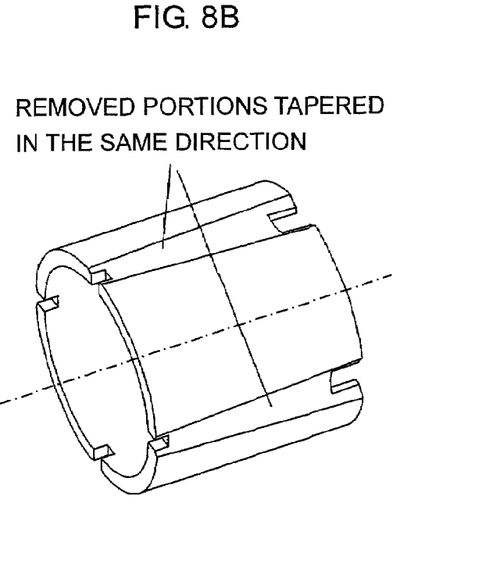

FIGS. 8A and 8B show examples in which tapered thin portions are formed through arcuate cutting and rectangular cut portions are formed and in which, in order to cause the magnetic flux of the magnet integrated in the thrust direction to change more smoothly between the magnetic poles of the magnet, the cut portions formed at the opposite ends have different sizes, and the sizes (widths) of the removed portions are linearly changed along the length direction of the magnet. FIG. 8A shows an example in which removed portions whose widths are reduced from the right end to the left end and removed portions whose widths are reduced from the left end to the right end are alternately arranged in the circumferential direction. FIG. 8B shows an example in which all the removed portions are formed such that the width decreases from the right end to the left end, for example.

Figure 9A:
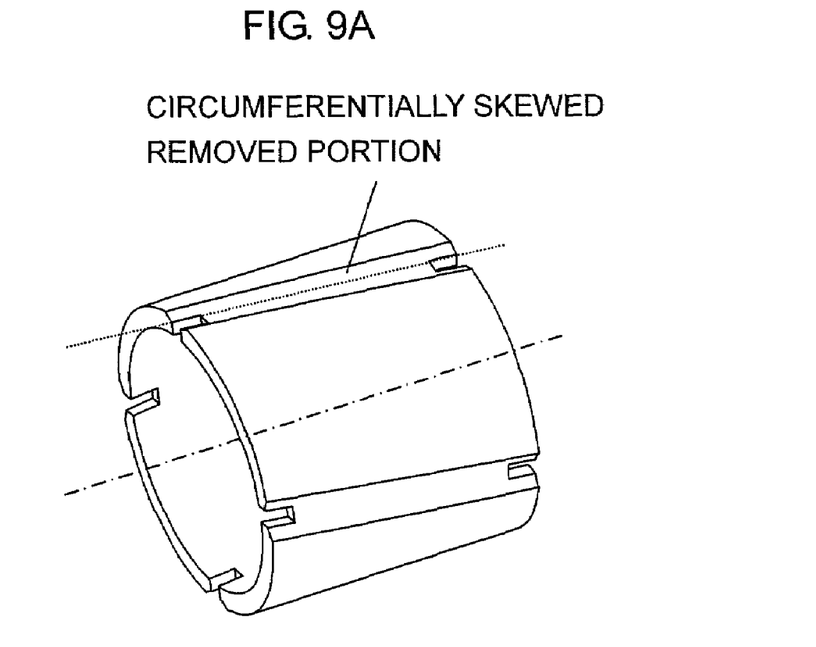
FIGS. 9A and 9B are views showing example thin portions each formed by a removed portion skewed with respect to a direction parallel to the shaft.
Figure 9B:
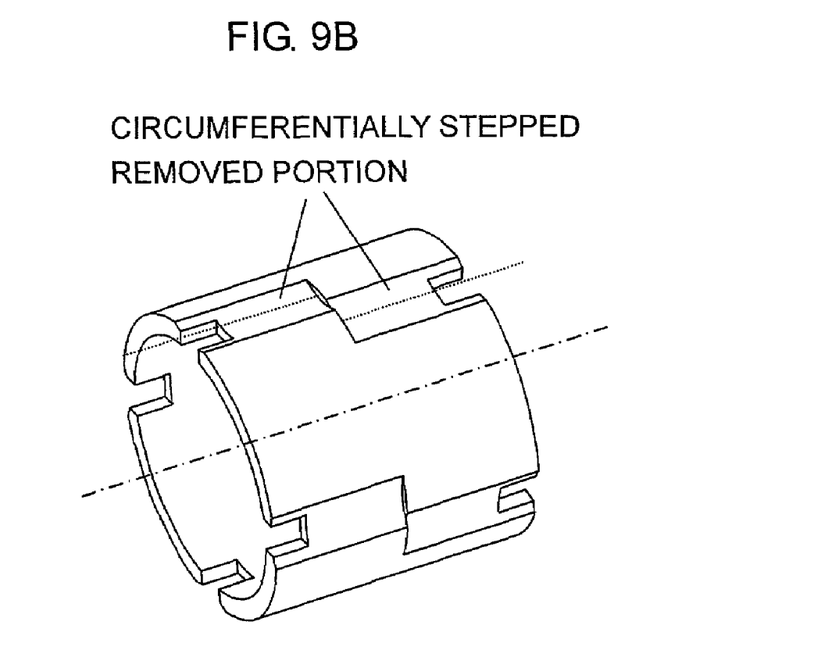

FIGS. 9A and 9B show examples in which thin portions are formed through arcuate cutting and rectangular cut portions are formed and in which, in order to cause the magnetic flux of the magnet integrated in the thrust direction to change more smoothly between the magnetic poles, the removed portions are skewed with respect to a direction (thrust direction parallel to the shaft). FIG. 9A shows an example in which removed portions having a constant width over the length of the magnet are skewed in the circumferential direction. FIG. 9B shows an example in which each of the removed portions is shifted in the circumferential direction at the center with respect to the length direction of the magnet.

Figure 10A:
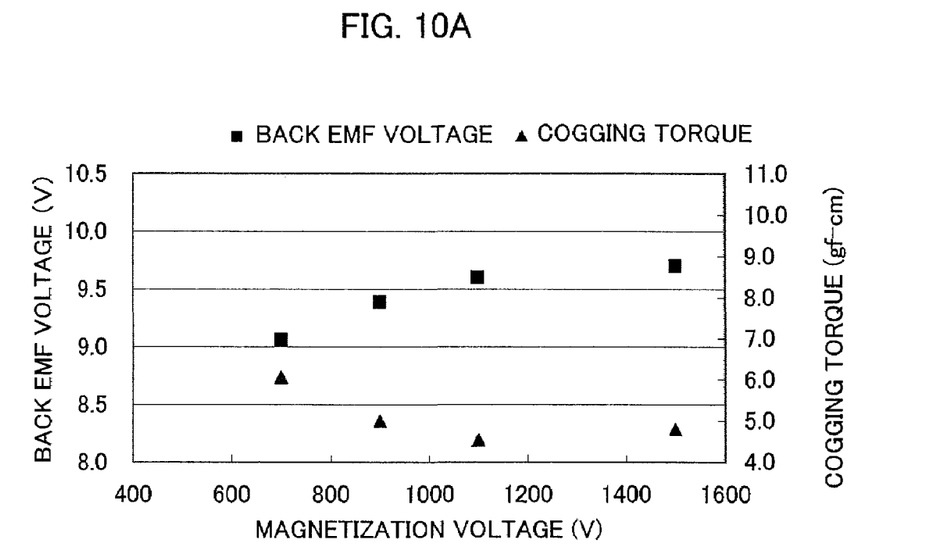
FIG. 10A is a graph showing the results of measurements performed for the small-sized motor according to the present invention.
Figure 10B:
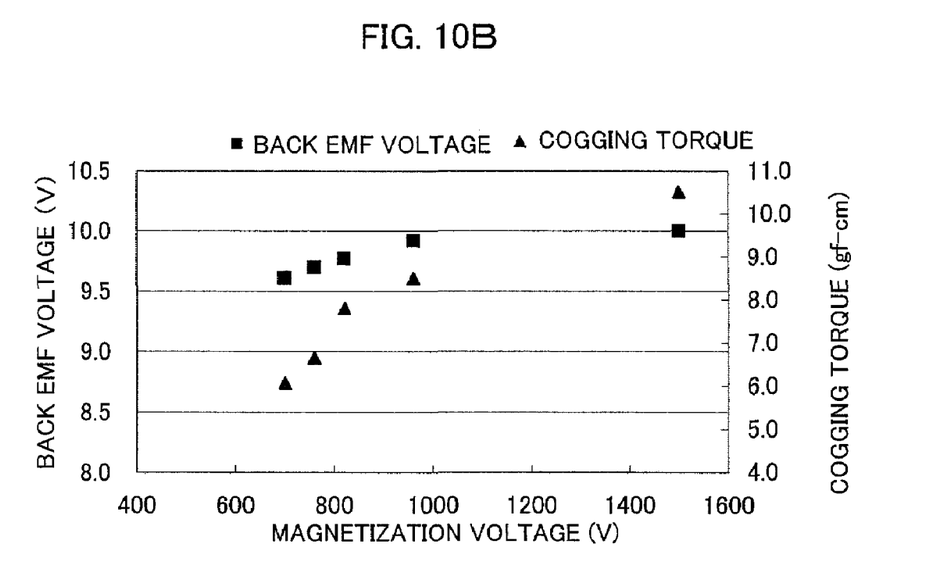
FIG. 10B is a graph showing the results of measurements performed for a conventional small-sized motor.

In the small-sized motor according to the present invention, through employment of a ring-shaped magnet having thin portions between the field poles, cogging torque can be reduced without causing an excessive drop in motor output torque. This will be described with reference to the graphs shown in FIGS. 10A and 10B. FIG. 10A is a graph showing the results of measurements performed for the small-sized motor according to the present invention, and FIG. 10B is a graph showing the results of measurements performed for a conventional small-sized motor. The motor including the magnet according to the present invention and used in the measurements has a structure as shown in FIG. 3. The conventional small-sized motor used in the measurements includes a ring-shaped magnet of a constant thickness which does not have thin portions, but is identical with the motor of the present invention in terms of the structures of other components such as a rotor.

In each of the graphs of FIGS. 10A and 10B, the horizontal axis represents magnetization voltage, and the vertical axis represents back emf voltage (V) and cogging torque (gf·cm). The magnetization voltage refers to voltage applied to a coil of a magnetization apparatus, which magnetizes a magnet material formed into a predetermined shape. For example, in the motor of the present invention, use of a magnet magnetized at 1500 V decreases cogging torque by 50% or more, from 10.5 gf·cm (the conventional motor) to 5.0 gf·cm or less, without lowering the performance (the back emf voltage is generally the same as that of the conventional motor).

What is claimed is:

1. A small-sized motor comprising:
   a motor casing having an inner circumferential surface;
   an adhesive;
   a field magnet attached to said inner circumferential surface of said motor casing via said adhesive, said field magnet having four or more magnetic poles, wherein the field magnet is formed of a single ring-shaped magnet member having a predetermined thickness with respect to a radial direction and a predetermined length with respect to a thrust direction, the magnet member having a thin portion having a reduced thickness with respect to the radial direction of said magnet member, said thin portion and said inner circumferential surface defining a clearance, said adhesive being inserted into said clearance, said thin portion being located at a portion between said magnetic poles formed through magnetization, the thin portion being formed by cutting the magnet member from a radially outward side of said magnet member to form removed portions, said magnetization being performed in the radial direction such that S poles and N poles are alternately formed in the circumferential direction, said magnet member having cut portions formed at opposite end portions of said magnet member with respect to the thrust direction, each of said cut portions being located between the magnetic poles, each of said removed portions having one or more of an arcuate cross section, a semicircular cross section, a flat cross section and a concave cross section, wherein each said thin portion has different widths at opposite ends thereof with respect to the thrust direction.

2. A small-sized motor according to claim 1, wherein each of the thin portions is skewed with respect to the thrust direction or formed such that a portion of the thin portion is circumferentially shifted from the remaining portion thereof.

3. A small-sized motor comprising:
a motor casing having an inner circumferential surface;
an adhesive;
a field magnet attached to said inner circumferential surface of said motor casing via said adhesive, said field magnet having four or more magnetic poles, wherein the field magnet is formed of a single ring-shaped magnet member having a predetermined thickness with respect to a radial direction and a predetermined length with respect to a thrust direction, the magnet member having a thin portion having a reduced thickness with respect to a radial direction of said magnet member, said thin portion and said inner circumferential surface defining a clearance, said adhesive being inserted into at least a portion of said clearance such that said adhesive engages said thin portion and said inner circumferential surface, said thin portion being located at a portion between said magnetic poles formed through magnetization, the thin portion being formed by cutting the magnet member from a radially outward side of said magnet member to form removed magnet member portions, said magnetization being performed in the radial direction such that S poles and N poles are alternately formed in the circumferential direction, said field magnet being a neodymium bond magnet, wherein each said thin portion has a width that is different from another thin portion at opposite ends thereof with respect to the thrust direction.

4. A small-sized motor according to claim 3, wherein each of said removed magnet member portions has one or more of an arcuate cross section, a semicircular cross section, a flat cross section and a concave cross section.

5. A small-sized motor according to claim 3, wherein each of said thin portions is offset with respect to said thrust direction or formed such that a portion of said thin portion is circumferentially shifted from a remaining portion thereof.

6. A motor, comprising:
a motor casing having an inner circumferential surface;
an adhesive;
a field magnet attached to said inner circumferential surface of said motor casing via said adhesive, said field magnet having four or more magnetic pole sections, said field magnet being formed of an annular magnet member, said magnet member having an outer circumferential surface extending in an axial direction of said magnet member, said magnet member having a first annular end surface extending in a circumferential direction of said magnet member at one end of said magnet member, said magnet member having a second annular end surface extending in said circumferential direction of said magnet member at another end of said magnet member, each of said magnetic pole sections having a magnetic pole section thickness, said outer circumferential surface defining a plurality of thin portions on an outward side of said magnet member, each of said thin portions and said inner circumferential surface defining a clearance, said adhesive being inserted into at least a portion of each said clearance, said adhesive engaging at least a portion of said outer circumferential surface and a portion of said inner circumferential surface, each of said thin portions having a thin portion thickness, wherein each said thin portion thickness of one of said thin portions is different than said thin portion thickness of another of said thin portions, said thin portion thickness being less than said magnetic pole section thickness with respect to a radial direction of said magnet member, each of said thin portions being adjacent to one of said magnetic pole sections and another of said magnetic pole sections, said magnet member being magnetized such that each magnetic pole section has an S pole and N pole that is opposite from an S pole and N pole of an adjacent magnetic pole section, wherein S poles and N poles of said magnetic pole sections are alternately formed in a circumferential direction of said magnet member, said first annular end surface and said outer circumferential surface defining a plurality of first cut portions at said one end of said magnet member, said second annular end surface and said outer circumferential surface defining a plurality of second cut portions at said another end of said magnet member, each of said first cut portions and each of said second cut portions being located adjacent to one of said magnetic pole sections and another of said magnetic pole sections.

7. A motor according to claim 6, wherein each of said thin portions is offset with respect to an axial axis of said magnet member.

8. A motor according to claim 6, wherein said outer surface is cut from a radially outward side of said magnet member to form said thin portions.

9. A small-sized motor comprising:
a motor casing having an inner circumferential surface;
an adhesive;
a field magnet attached to said inner circumferential surface of said motor casing via said adhesive, said field magnet having four or more magnetic poles, wherein the field magnet is formed of a single ring-shaped magnet member having a predetermined thickness with respect to a radial direction and a predetermined length with respect to a thrust direction, the magnet member having a thin portion having a reduced thickness with respect to the radial direction of said magnet member, said thin portion and said inner circumferential surface defining a clearance, said adhesive being inserted into said clearance, said thin portion being located at a portion between said magnetic poles formed through magnetization, the thin portion being formed by cutting the magnet member from a radially outward side of said magnet member to form removed portions, said magnetization being performed in the radial direction such that S poles and N poles are alternately formed in the circumferential direction, said magnet member having cut portions formed at opposite end portions of said magnet member with respect to the thrust direction, each of said cut portions being located between the magnetic poles, each of said removed portions having one or more of an arcuate cross section, a semicircular cross section, a flat cross section and a concave cross section, wherein each said thin portion is skewed with respect to the thrust direction or formed such that a portion of the thin portion is circumferentially shifted from the remaining portion thereof.

10. A small-sized motor comprising:
a motor casing having an inner circumferential surface;
an adhesive;
a field magnet attached to said inner circumferential surface of said motor casing via said adhesive, said field magnet having four or more magnetic poles, wherein the field magnet is formed of a single ring-shaped magnet member having a predetermined thickness with respect to a radial direction and a predetermined length with respect to a thrust direction, the magnet member having a thin portion having a reduced thickness with respect to a radial direction of said magnet member, said thin portion and said inner circumferential surface defining a clearance, said adhesive being inserted into at least a portion of said clearance such that said adhesive engages said thin portion and said inner circumferential surface, said thin portion being located at a portion between said magnetic poles formed through magnetization, the thin portion being formed by cutting the magnet member from a radially outward side of said magnet member to form removed magnet member portions, said magnetization being performed in the radial direction such that S poles and N poles are alternately formed in the circumferential direction, said field magnet being a neodymium bond magnet, wherein each said thin portion is offset with respect to said thrust direction or formed such that a portion of said thin portion is circumferentially shifted from a remaining portion thereof.

11. A motor, comprising:
a motor casing having an inner circumferential surface;
an adhesive;
a field magnet attached to said inner circumferential surface of said motor casing via said adhesive, said field magnet having four or more magnetic pole sections, said field magnet being formed of an annular magnet member, said magnet member having an outer circumferential surface extending in an axial direction of said magnet member, said magnet member having a first annular end surface extending in a circumferential direction of said magnet member at one end of said magnet member, said magnet member having a second annular end surface extending in said circumferential direction of said magnet member at another end of said magnet member, each of said magnetic pole sections having a magnetic pole section thickness, said outer circumferential surface defining a plurality of thin portions on an outward side of said magnet member, wherein each of said thin portions is offset with respect to an axial axis of said magnet member, each of said thin portions and said inner circumferential surface defining a clearance, said adhesive being inserted into at least a portion of each said clearance, said adhesive engaging at least a portion of said outer circumferential surface and a portion of said inner circumferential surface, each of said thin portions having a thin portion thickness, said thin portion thickness being less than said magnetic pole section thickness with respect to a radial direction of said magnet member, each of said thin portions being adjacent to one of said magnetic pole sections and another of said magnetic pole sections, said magnet member being magnetized such that each magnetic pole section has an S pole and N pole that is opposite from an S pole and N pole of an adjacent magnetic pole section, wherein S poles and N poles of said magnetic pole sections are alternately formed in a circumferential direction of said magnet member, said first annular end surface and said outer circumferential surface defining a plurality of first cut portions at said one end of said magnet member, said second annular end surface and said outer circumferential surface defining a plurality of second cut portions at said another end of said magnet member, each of said first cut portions and each of said second cut portions being located adjacent to one of said magnetic pole sections and another of said magnetic pole sections.

* * * * *